Sept. 24, 1968  J. J. MROWKA ET AL  3,403,299
ELECTRIC CIRCUIT CONTROL DEVICE PANEL BOARD WITH
POSITION CONTROL AND ASSEMBLY
Filed June 1, 1967  2 Sheets-Sheet 1

INVENTORS.
JOSEPH J. MROWKA,
DAVID B. POWELL

BY Robert A. Casey
ATTORNEY

INVENTORS
JOSEPH J. MROWKA,
DAVID B. POWELL

BY Robert H. Casey
ATTORNEY

United States Patent Office 3,403,299
Patented Sept. 24, 1968

3,403,299
ELECTRIC CIRCUIT CONTROL DEVICE PANEL BOARD WITH POSITION CONTROL AND ASSEMBLY
Joseph J. Mrowka, Plainville, and David B. Powell, Bristol, Conn., assignors to General Electric Company, a corporation of New York
Filed June 1, 1967, Ser. No. 642,853
10 Claims. (Cl. 317—99)

ABSTRACT OF THE DISCLOSURE

There is disclosed an electric circuit control device panel board for use with first and second circuit control devices. The second control devices differ from the first essentially by being of narrower width. The combination includes interconnected pairs of devices of the narrower width used as "two-pole" control devices. The panel and the two-pole devices include cooperating polarizing means to insure that the two-pole devices will be properly mounted in the panel.

Background of the invention

The present invention relates to electric circuit control device panel boards and, more particularly, to such panel boards which are adapted to receive control devices of two different widths or modules with means thereon for positioning a pair of coupled control devices in desired alignment and engagement.

In United States Patent No. 3,309,580, granted Mar. 14, 1967, to Lewis W. Jacobs and Robert J. Sabatella and assigned to the same assignee as the present invention, there is disclosed a panel board assembly utilizing electrical contacts providing contact blades extending generally normally to the side wall of the base or saddle of the panel board and contact blades which extend substantially parallel thereto. The normally extending contact blades are adapted to be electrically engaged by contact jaws of a circuit breaker or other control device extending generally parallel to the longitudinal axis of the control device whereas the parallel extending contact blades or wing portions as shown therein are adapted to be electrically engaged by contact jaws on a smaller module control device which extend normally to the longitudinal axis thereof.

In mounting control devices of various types into plug-in panel boards, it has been generally customary to employ a configuration for the base or saddle portion of the panel board and for the rear end of the control device which would permit interengagement thereof and then pivoting of the control device into electrical engagement with the contact blades. One form for such interengagement is shown in the aforementioned Jacobs et al. patent wherein hooks are provided upon the upstanding side wall which engage in a slot formed in the rear of the control devices. Although such retaining means are generally satisfactory, it is desirable to provide distinctive means for retaining the two modules of control devices so as to ensure proper alignment thereof in desired positions with respect to the various contact blades.

In the copending application of Joseph J. Mrowka, Ser. No. 642,917, filed June 1, 1967, and assigned to the same assignee as the present invention, there is disclosed a panel board construction for positioning two different modules of control devices in predetermined locations and for providing retention against lateral and vertical movement. In the device therein illustrated, the hook-shaped elements along a flange at the side wall engage in a recess in the rear surface of a large module control device and tongues projecting from the rear of a small module control device seat in channels between the hook-shaped elements. The preferred construction utilizes small module control devices with a pair of spaced tongues projecting rearwardly therefrom and apertures in the hook-shaped elements which receive the tongue not seated in the channel so as to provide firm retention of the control devices. Two small width control devices may be positioned side-by-side with their adjacent tongues either in the channel between the hook-shaped elements or in the hook-shaped element.

On occasion, two small width control devices may be coupled so as to control a plural phase circuit. Accordingly, it is essential that the contact jaws of the coupled devices engage contact blades of the conductor means carrying current of different phases.

It is an object of the present invention to provide a novel electrical control device panel board incorporating means for retaining control devices of two different modular sizes in predetermined positions with respect to the contact blades against undesired lateral movement and providing means permitting positioning of a coupled pair of smaller module control devices only at predetermined positions therealong.

It is also an object to provide such a panel board wherein the alignment of the contact blades and the retaining means will ensure proper positioning and disposition of a coupled pair of smaller module control devices with their contact jaws in electrical engagement with different phases of current.

Another object is to provide such a panel board which may be readily and economically fabricated and which provides positive positioning means for two modules of control devices while permitting facile insertion and disengagement of the control devices and positioning of the coupled pair of small module devices only in proper electrical engagement.

Summary of the invention

It has now been found that the foregoing and related objects can be readily obtained in an electrical circuit control device panel board for use with circuit control devices of different modular widths which has a base providing a generally planar center portion and at least one upstanding side wall thereon and a flange extending along the side wall. A multiplicity of inwardly projecting arms are spaced apart along the length of the flange so as to provide channels therebetween and upwardly projecting fingers on the arms provide hook portions cooperating with the flange to retain the cooperating rear portions of the control devices therebetween. The hook portions are engageable in cooperatively dimensioned recesses in the rear surface of one modular width control device and the channels are dimensioned cooperatively to receive a pair of adjacent tongues projecting from the rear surface of two smaller modular width control devices. The flange has slots therein registering substantially with the centers of the channels between the hook portions for receiving a tongue or key depending from between a coupled pair of adjacent small module control devices to provide for seating thereof only with such a slot receiving such a tongue and for rejection thereof between the slots.

Conductor means is disposed above the center portions of the base and the upstanding contact blades on the conductor means are spaced from the side wall in predetermined alignment and directional orientation with respect to the hook portions and channels so as to permit electrical engagement thereon of control devices of different width or modules. In at least some locations, separate contact blades are provided to opposite sides of the slots for coupling to current of different phases so that the coupled control devices will be electrically connected to different phases of current.

Generally, the panel board will have conductor means providing some contact blades which extend parallel to the side wall and other contact blades which extend normally thereto with the normally extending contact blades being aligned with the centers of the hook portions of the side wall. The parallel extending contact blades extend in alignment with at least a portion of the channels between the hook portions.

In accordance with the preferred embodiment, the conductor means includes contact elements having a first blade portion extending parallel to the side wall and a second blade portion intersecting the first blade portion and extending normally to the side wall so as to permit mounting of control devices having contact jaws extending parallel or normal to the longitudinal axis thereof. One type of contact of the preferred type is illustrated in the aforementioned Jacobs et al. Patent No. 3,309,580 wherein the first blade portions extending parallel to the side wall provide wings to either side of the second blade portion for mounting thereon a pair of the smaller module circuit breakers. As seen therein, the contact elements may include two blade portions extending parallel to the side wall so as to permit mounting of a pair of circuit breakers extending from each side of the panel board or a total of four circuit breakers.

However, the specific construction of the conductor means may vary depending upon the nature of the control devices employed therewith and the type and number of devices desired to be positionable at any point in the panel board. The essential feature of the conductor means is that it provides the upstanding contact blades in predetermined alignment and directional orientation with respect to the hook portions and with respect to the channels therebetween. In at least some locations, the conductor means provides two different contact blades extending in alignment with the channels between hook portions.

In one embodiment of the present invention, the side wall has integrally formed therewith an outwardly extending flange from which the arms project. However, it will also be appreciated that a suitable flange may be provided by a separate element cooperating with the side wall and that the arms may be formed integrally with the flange or they may be formed of a separate element mounted thereon or closely adjacent thereto so as to provide the requisite construction.

In the preferred construction, each of the arms has an aperture therein adapted to receive a pair of tongues of control devices having a pair of spaced-apart tongues adjacent the side surfaces thereof. Accordingly, one tongue of such devices fits within the aperture of the arm whereas the other tongue extends into the channel between the hook portions with the unapertured portion or strap portion of the arm being disposed in the channel between the spaced-apart tongues. It will be appreciated that the engagement of the tongue within the aperture of the arms will restrict vertical movement of the control device and provide means for retaining the control devices in the channels and in assembly with the panel board. The slots in the flanges normally extend into the side wall so as to permit seating of the depending tongue therein, although such may not be necessary when the flange is a separate element or inwardly extending.

As will be appreciated from the description of the preferred embodiment of construction for the conductor means and the reference to the aforementioned Jacobs et al. patent, the control devices for which the present invention is particularly adapted are modules wherein the one type is approximately one-half the width of the other. The larger module control device has its contact jaws extending parallel to the longitudinal axis thereof and accordingly normally to the side wall of the base or saddle of the panel board. The large module device has a recess formed therein which is dimensioned to receive the finger on the hook portion so as to limit both vertical and horizontal movement of the device.

The smaller module device has its contact jaws extending normally to the longitudinal axis thereof and accordingly parallel to the side walls of the base or saddle of the panel board. It preferably has two tongues projecting rearwardly thereof depending upon the particular means selected for the construction of the hook portions to provide retention of the control devices in the several channels. In the adjacent side surfaces of at least the coupled smaller module control devices, a suitable recess is desirably molded to receive and seat a key to provide the depending tongue. Such recesses and keys are desirably of T-shaped configuration, and the recesses are ideally molded in both sides of the housing to permit interchangeability. The key is retained in position when the control devices are coupled.

By suitable selection of the configuration of the conductor means and the contact blades thereof as well as their disposition with respect to the hook portions and the channels therebetween, various arrangements of the small and large module control devices may be permitted at various locations along the length of the panel board. Two large module breakers may be seated on a contact blade with their front ends in abutment or a large module breaker may be opposed by a pair of smaller module breakers or smaller module breakers may be located in opposition to each other. In addition, the smaller module breakers may be mounted adjacent to each other with a contact blade of one current phase and the other in electrical engagement with a contact blade of a second current phase.

*Detailed description of the illustrated embodiments*

Figure 1:
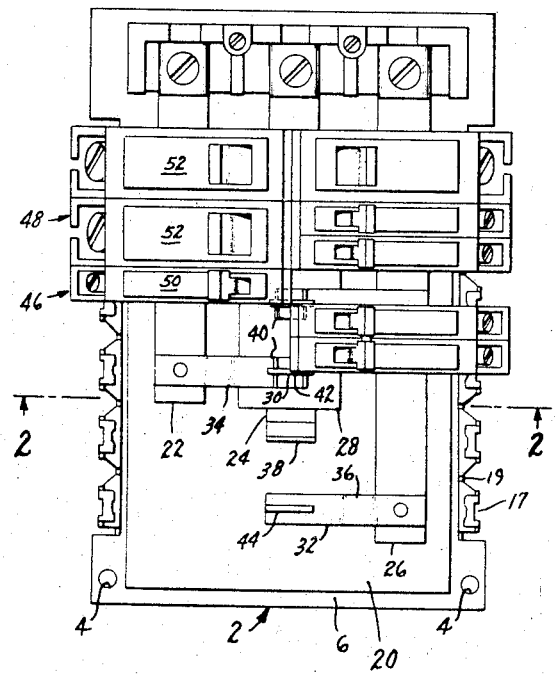
FIGURE 1 is a plan view of an electric circuit control device panel board assembly embodying the present invention.

Turning now to the drawings in detail, a panel board load center has a base or saddle generally designated by the numeral 2 and adapted to be mounted in a suitable enclosure (not shown) by fasteners (not shown) extending through the apertures 4 therein. The base 2 has a generally planar center portion 6 and upstanding parallel side wall portions 8, each with an outwardly projecting shelf generally designated by the numeral 10 and defined by an outwardly extending flange 12 and upstanding arms 14 spaced apart to define channels 16 therebetween. The arms 14 have apertures 17 formed therein providing unapertured strap portions at the sides thereof and have inwardly extending fingers 18 at their upper ends so as to form substantially hook-shaped elements cooperating with the flange 12. Slots 19 registering with the center of the channels 16 are provided in the flange 12 and adjacent portion of the side wall portions 8.

Figure 2:
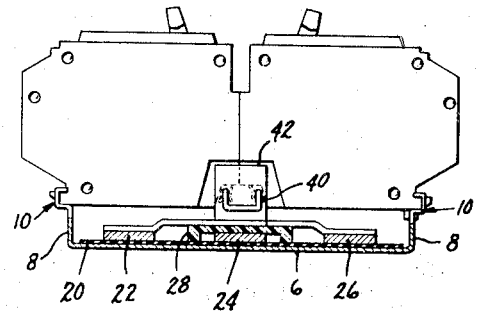
FIGURE 2 is a sectional view along the line 2—2 of FIGURE 1.

On the center portion 6 of the base 2 are sheets 20 of insulation and three spaced busbars 22, 24 and 26 which extend substantially parallel to the side wall portions 8. Additional insulating means 28 is provided over the busbar 24 as seen in FIGURES 1 and 2.

Supported on the busbars 22, 26 are a plurality of contacts generally designated by the numerals 30, 32 which have arm portions 34, 36 extending inwardly over the busbar 24 in substantially parallel relationship. The contacts 30 have a generally U-shaped contact blade 40 at the end of the arm portion 34 with the legs thereof extending parallel to the several busbars 22, 24 and 26 as well as to the side wall portions 8. In addition, a central contact blade 42 of greater height than the legs of the U-shaped contact blade 40 is mounted thereon and bisects the U-shaped contact blade 40 so as to extend normally to the several busbars 22, 24 and 26 well as to the side wall portions 8.

The contact 32 has a single contact blade 44 upstanding from its arm portion 36 and extending normally to the busbars 22, 24 and 26 and to the side wall portions 8. The busbar 24 has an upstanding contact blade 38 thereon which extends normally to the several busbars 22, 24 and 26. In addition, the busbar 24 has a contact 39 thereon (seen only in FIGURE 8) similar to the contacts 30 in that it has a U-shaped contact blade 41 and central contact blade 43 similarly oriented.

Mounted on the panel board load center are circuit breakers of two different widths designated generally by the numerals 46, 48 and each having insulating casings or housings 50, 52, respectively, and operating handles 54, 56, respectively. Generally, the circuit breakers 46, 48 employ conventional construction except as pointed out hereinafter.

Figure 7:
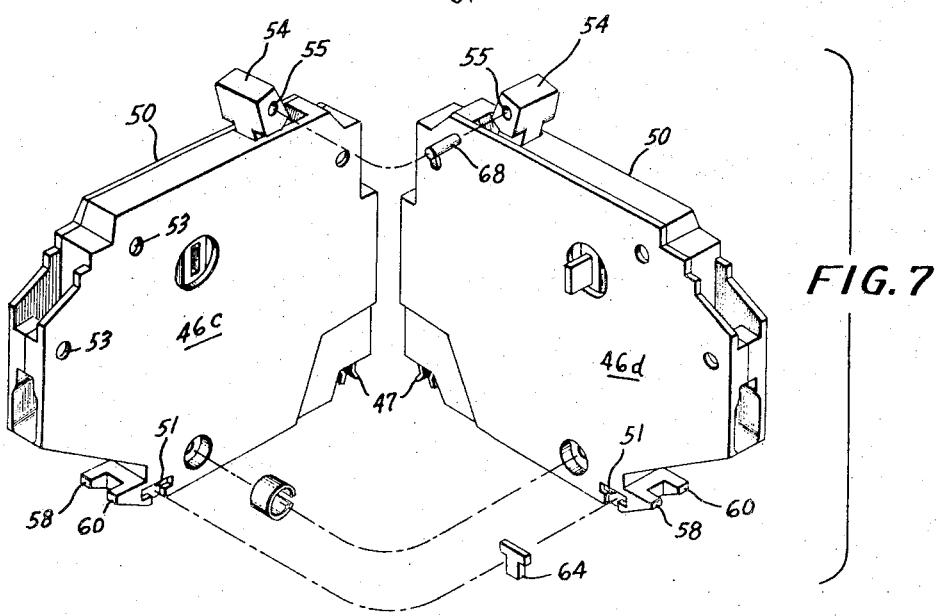
FIGURE 7 is a perspective view of a coupled pair of small width control devices pivoted apart and with coupling components separated therefrom.
Figure 8:
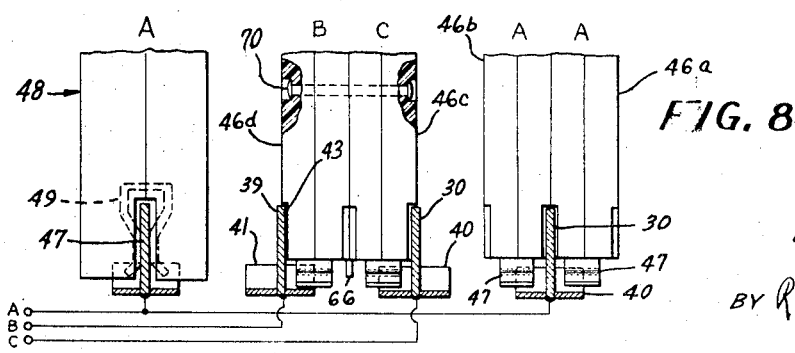
FIGURE 8 is a diagrammatic view showing a large width control device mounted on a contact, a coupled pair of small width control devices mounted on different contacts, and an uncoupled pair of small width control devices mounted on a single contact, and showing current phases connected to the several contacts.

The smaller module circuit breaker 46 is one-half the width of the larger breaker 48 and, as seen in FIGURES 7 and 8, has contact jaws 47 at its inner or front end which extend normally to its longitudinal axis and thus parallel to the side wall portions 8 and the legs of the U-shaped contact blades 40, 41. At the rear ends, the rear surface of the housing 50 has formed thereon a rearwardly projecting pair of spaced tongues or tangs 58, 60 which are situated adjacent the side surfaces thereof so as to provide a slot therebetween dimensioned to receive the unapertured strap portions of the arms 14.

The housing 50 is also formed with T-shaped recesses 51 in the side surfaces thereof opening at the bottom edge and closely adjacent the rear edge. Apertures 53 for receiving threaded fasteners extend through the housing 50 and recesses 55 extend inwardly into the handle 54 from both side surfaces thereof.

The larger module circuit breaker 48 has contact jaws 49 at its inner or front end which extend parallel to its longitudinal axis and thus normally to the side wall portions 8 and parallel to the central contact blades 42, 43 and contact blade 44. The rear surface of the housing 52 has a recess 62 formed therein adjacent the lower end thereof dimensioned to receive the fingers 18.

Thus, it can be seen that the larger module circuit breakers 48 are mountable on the central contact blades 42, 43 and contact blade 38 and the small module circuit breakers 46 are mountable on the U-shaped contact blades 40, 41. By proper location of the contacts 30 relative to the fingers 18, it is possible to provide for mounting of the two types of breakers only in predetermined positions and thus to prevent inadvertent assembly of two of the smaller module circuit breakers 46 in adjacent positions electrically connected to the same or different current phases. However, it may be desirable to provide for maximum versatility in mounting of circuit breakers on the panel board so that contacts 30, 39 are used to the maximum extent feasible with their central contact blades 42, 43 aligned with the centers of the fingers 18.

Figure 5:
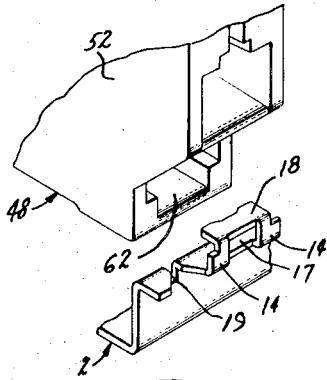
FIGURE 5 is a similar view of a large width control device.
Figure 6:
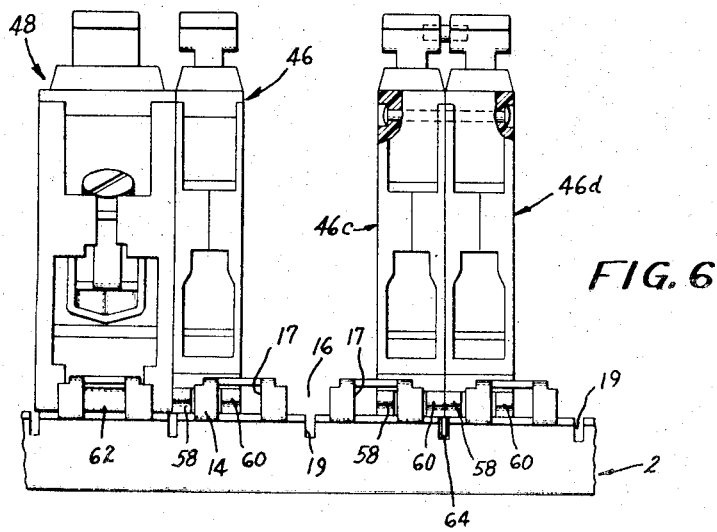
FIGURE 6 is a fragmentary side elevational view of a panel board assembly showing a large width control device, an uncoupled small width control device and a coupled pair of small width control devices.

As can be seen in FIGURES 5 and 6, the large module circuit breaker 48 is mounted with the finger 18 extending into its recess 62 to lock it onto the shelf 10 and is then pivoted downwardly so that its contact jaws 49 engage about opposite surfaces of the central contact blade 42 of a contact 30 (as seen in FIGURE 8) to provide electrical contact with its associated busbar. However, the arm 16 frustrates efforts to insert a smaller module circuit breaker 46 in precisely the same position since the tongues 58, 60 will abut against the strap portions thereof.

Figure 4:
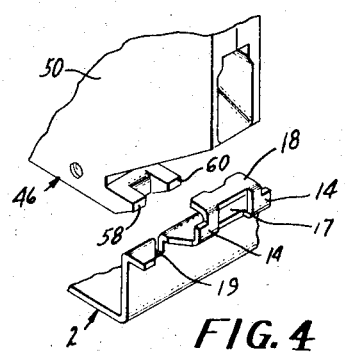
FIGURE 4 is a similar view of a single or uncoupled small width control device.
Figure 3:
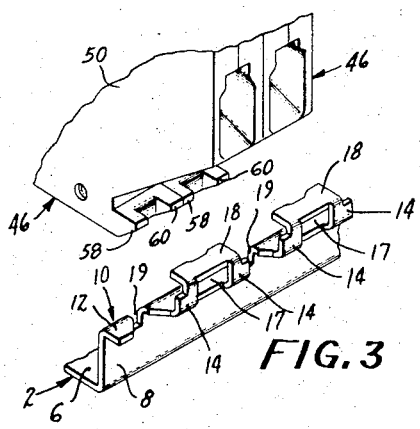
FIGURE 3 is a fragmentary partially exploded perspective view to an enlarged scale of a pair of coupled small width control devices and a portion of the base cooperating therewith.

By displacing the smaller module breaker 46 slightly along the longitudinal axis of the busbar 22, 24 and 26, the two tongues 58, 60 will now bridge the strap portion of the arms 14 by reason of the spacing therebetween with one tongue extending through the channel 16, as best seen in FIGURES 3, 4 and 6. When the breaker 46 is now pivoted downwardly, its contact jaws 47 engage opposite surfaces of the nearest leg of the U-shaped contact blade 40 or 41.

As seen in FIGURES 1 and 8 (the pair labelled AA), two small module circuit breakers 46 may be positioned side by side in electrical engagement with a single contact 30 in the space which would be occupied by a single large module breaker 48. The tongue 58 of one breaker 46a seats in the channel 16 to one side of the arm 14 while its other tongue 60, as well as the adjacent tongue 60 as well as the tongue 58 of its companion breaker seat in the aperture 17 of the arm 14. The tongue 46b seats in the channel to the other side of the arm 14. Thus, the two breakers 46a, 46b are locked in engagement on the shelf 10 by virtue of the engagement of their respective tongues 58, 60 in the aperture 17 of the arm 14. As will be appreciated from FIGURE 8, their contact jaws 47 engage opposite surfaces of the adjacent leg of the U-shaped contact blade 40 to opposite sides of the central contact blade 42.

However, when two small module circuit breakers 46c, 46d are to be connected together to provide a two pole breaker for a 120/240 volt circuit, additional means are provided to prevent the coupled breakers 46c, 46d from being connected to a single contact or phase. To ensure that such coupled breakers will be connected to two different contacts, a T-shaped slug 64 is inserted in the T-shaped recess 51 in the adjacent side surfaces of the breakers 46c, 46d and provides a tongue 66 depending from the coupled breakers as seen in FIGURES 2, 6 and 7. This tongue 66 prevents insertion of the coupled breakers 46c, 46d onto the shelf with their adjacent rearward tongues 58, 60 in an aperture 17 in an arm 14; however, the tongue 66 will slide into the slot 19 at the centers of the channels 16 so that the adjacent tongues 58, 60 may be received in the channel 16 as seen in FIGURE 6. In this manner, it is ensured that the coupled breakers 46c, 46d will be electrically connected to two different contacts, and by the proper arrangement of the contacts, to two different current phases.

The breakers 46c, 46d are secured together as seen in FIGURES 6–8 with headed fasteners 70 extending through the apertures 53 in the two housings 50. A pin 68 seats in the adjacent recesses 55 of the handles 54 to provide for simultaneous movement thereof and thus operation of the breaker mechanism.

FIGURE 8 diagrammatically illustrates the principles involved. As seen therein, the large module breaker 48 is electrically connected onto the central contact blade 42 of a contact 30 which is connected to a busbar with a phase designated A. The coupled small module breakers 46c, 46d are electrically connected onto the adjacent portions of U-shaped contact blades 40, 41 of contacts 30, 39 which are connected to different busbars with phases designated B and C, respectively. The tongue 16 is shown depending from therebetween. Lastly, a pair of uncoupled small module circuit breakers 46a, 46b are shown electrically connected on the U-shaped contact blade 40 of a single contact 30 which is connected to a busbar with a phase designated A.

Thus, it can be seen that the present invention provides a novel and highly effective control device panel board for mounting and securing electrical control devices of two different modules which permits a great degree of versatility and ease of assembly. Coupled circuit control devices are mountable only in electrical engagement with different contacts and thereby inadvertent misassembly to a single current phase can be avoided.

While the invention has been illustrated in only one embodiment, it will be readily apparent that many modifications thereof may be made, and we therefore intend by the appended claims to cover all such modifications as fall within the true spirit and scope of the invention.

What we claim as new and desire to secure by Letters Patent of the United States is:

1. In an electrical circuit control device panel board for use with circuit control devices of different widths, the combination comprising:
    (a) a base having a generally planar center portion and at least one upstanding side wall thereon with a flange therealong and upstanding arms spaced apart along the length of said flange to provide channels therebetween with fingers projecting inwardly from the upper ends thereof to provide hook portions cooperating with the flange to retain the cooperating rear portions of electric circuit control devices therebetween, said channels being dimensioned to receive adjacent tongues projecting from the rear of two small width control devices, said flange having slots therein registering substantially with the centers of said channels between said arms for receiving a tongue depending from between a coupled pair of adjacent small width control devices to provide for seating thereof only with a slot receiving the depending tongue and for rejection thereof between said slots; and
    (b) conductor means above said center portion of said base including upstanding contact blades spaced from said side wall in predetermined alignment and directional orientation with respect to said hook portions and channels and providing separate contact blades to each side of at least one of said slots for coupling to current of different phases.

2. The panel board of claim 1 wherein said conductor means includes two contact blades from distinct electrical paths extending into alignment with at least one of said channels whereby the pair of control devices will be coupled in electrical engagement with different blades of said two contact blades.

3. The panel board of claim 1 wherein said arms have an aperture therein dimensioned to receive adjacent tongues projecting from the rear of two small width control devices.

4. The panel board of claim 1 wherein said conductor means includes contacts having a first blade portion extending parallel to said side wall and a second blade portion intersecting said first blade portion and extending normally to said side wall in alignment with the center of one of said hook portions so as to permit mounting of a large width control device having a pair of contact jaws extending parallel to its longitudinal axis on said second blade portion and a pair of small width control devices having a pair of contact jaws extending normally to the longitudinal axis on the first blade portion to opposite sides of the second blade portion.

5. The panel board of claim 1 wherein said flange is formed integrally with said side wall and wherein said slots in said flange extend downwardly into said side wall.

6. In an electrical circuit control device panel board for use with circuit control devices of different widths where the larger width device has a recess in the rear surface thereof and the smaller width device has a pair of spaced tongues projecting rearwardly therefrom, the combination comprising:
    (a) a base having a generally planar center portion and a pair of upstanding, parallel side walls each having outwardly projecting flanges and upstanding arms spaced apart along the length of said flanges to provide channels therebetween, said arms having fingers projecting inwardly from the upper ends thereof to provide hooks cooperating with the flange to retain the cooperating portions of electrical circuit control devices therebetween, said arms having apertures therein and unapertured strap portions at the sides thereof with the apertures and arms being dimensioned to receive a pair of tongues from adjacent small width control devices each having a pair of spaced tongues projecting rearwardly therefrom with the strap portions being received between the pairs of tongues, said flanges and side walls having slots therein registering substantially with the centers of said channels between said arms for receiving a tongue depending from between the pair of adjacent small width control devices to provide for seating thereof only with such slots receiving the depending tongue and for rejection thereof between said slots; and
    (b) conductor means above said center portion of said base including contacts each having a first upstanding contact blade extending parallel to said side walls and a second upstanding center contact blade extending normally to said side walls and normally to and intersecting said first contact blade, at least some of said contacts being aligned with their center blades in substantial alignment with the centers of said hook portions whereby a control device of larger width having contact jaws extending parallel to its longitudinal axis may clamp opposite surfaces of a center blade and whereby a pair of narrower width control devices each having contact jaws extending normally to its principal axis may clamp opposite surfaces of the first contact blade to opposite sides of said center blade on the same contact and may also clamp opposite surfaces of first contact blades of two different contacts, said slots permitting mounting of a coupled pair of small width control devices with a depending tongue only in the latter disposition.

7. An electrical control device panel board assembly including:
    (a) a base having a generally planar center portion and at least one upstanding side wall thereon with a flange therealong and upstanding arms spaced apart along the length of said flange to provide channels therebetween with fingers projecting inwardly from the upper ends thereof to provide hook portions, said flange having slots therein registering substantially with the centers of said channels between said arms;
    (b) conductor means above said center portion of said base including upstanding contact blades spaced from said side wall in predetermined alignment and directional orientation with respect to said hook portions and channels; and
    (c) a pair of small width control devices having adjacent tongues projecting rearwardly therefrom seating in one of said channels and a depending tongue therebetween seated in the slot in said flange at said one channel and contact jaws electrically engaged with different contact blades.

8. The panel board assembly of claim 7 wherein said conductor means includes two contact blades from distinct electrical paths with said pair of control devices each being engaged with a different one of said two contact blades.

9. The panel board assembly of claim 7 wherein said arms have apertures therein providing unapertured strap portions at the sides thereof and wherein said pair of control devices each have a pair of spaced tongues extending rearwardly therefrom with the adjacent tongues being received within said channel and the remote tongues being seated in said apertures in said arms, the unapertured strap portions of the arms being received in the spacing between said tongues.

10. The panel board assembly of claim 7 wherein said conductor means includes a plurality of contacts each having a first blade portion extending parallel to said side wall and a second blade portion intersecting said first blade portion and extending normally to said side wall in alignment with the center of one of said hook portions, said contact devices having contact jaws extending normally to the longitudinal axis thereof and clamping on the first blade portions of different contacts.

References Cited
UNITED STATES PATENTS

| | | | |
|---|---|---|---|
| 2,738,446 | 3/1956 | Fleming | 317—119 |
| 3,309,580 | 3/1967 | Jacobs et al. | 317—119 |
| 3,333,157 | 7/1967 | Stokes | 317—119 |

LEWIS H. MYERS, *Primary Examiner.*

J. R. SCOTT, *Assistant Examiner.*